United States Patent [19]

Sorenson

[11] Patent Number: 4,926,631
[45] Date of Patent: May 22, 1990

[54] PAWL AND RATCHET CLUTCH AND AIR TURBINE STARTER HAVING SUCH A CLUTCH

[75] Inventor: Kal K. Sorenson, Tempe, Ariz.

[73] Assignee: Allied-Signal, Inc., Phoenix, Ariz.

[21] Appl. No.: 366,084

[22] Filed: Jun. 14, 1989

Related U.S. Application Data

[62] Division of Ser. No. 165,664, Mar. 8, 1988.

[51] Int. Cl.$^5$ .............................................. F02C 7/277
[52] U.S. Cl. ................................. 60/39.142; 74/7 C; 192/45.1; 192/47
[58] Field of Search ............ 60/39.142, 39.141, 39.06; 192/47, 45.1, 41 A; 74/7 C; 123/179 F, 179 AS

[56] References Cited

U.S. PATENT DOCUMENTS

| 1,946,177 | 2/1934 | Neurath | 192/47 |
|---|---|---|---|
| 2,077,253 | 4/1937 | Nardone | 192/47 |
| 2,640,359 | 6/1953 | Gilbert et al. | 74/7 C |
| 2,693,707 | 11/1954 | Gilbert | 74/7 C |
| 2,776,571 | 1/1957 | Simone | 74/7 C |
| 2,921,473 | 1/1919 | Fellows | 192/104 R |
| 2,951,570 | 9/1960 | Antrim, Jr. et al. | 74/7 C |
| 2,988,186 | 6/1961 | Dotter | 192/47 |
| 3,638,774 | 2/1972 | Burch et al. | 192/42 |
| 4,050,560 | 9/1977 | Torstenfelt | 192/47 |
| 4,187,728 | 2/1980 | Mazzorana | 192/47 |
| 4,702,273 | 10/1987 | Allen, Jr. et al. | 123/179 F |
| 4,805,470 | 2/1989 | Woodruff | 192/42 |

Primary Examiner—Donald E. Stout
Attorney, Agent, or Firm—Terry L. Miller; James W. McFarland

[57] ABSTRACT

An air turbine starter for use in starting a turbine engine includes a pawl and ratchet clutch having a movable member which selectively prevents engagement of the clutch while providing a pawl raceway surface, or allows clutch engagement. No-load acceleration of the air turbine starter is scheduled to ensure that drop-in speed of the centrifugally responsive pawls is not reached by the ratchet member while clutch engagement is being permitted. The movable member is pneumatically controlled in timed coordination with acceleration of the air turbine starter to prevent crash engagement of the clutch. Clutch ratcheting is also substantially prevented.

7 Claims, 4 Drawing Sheets

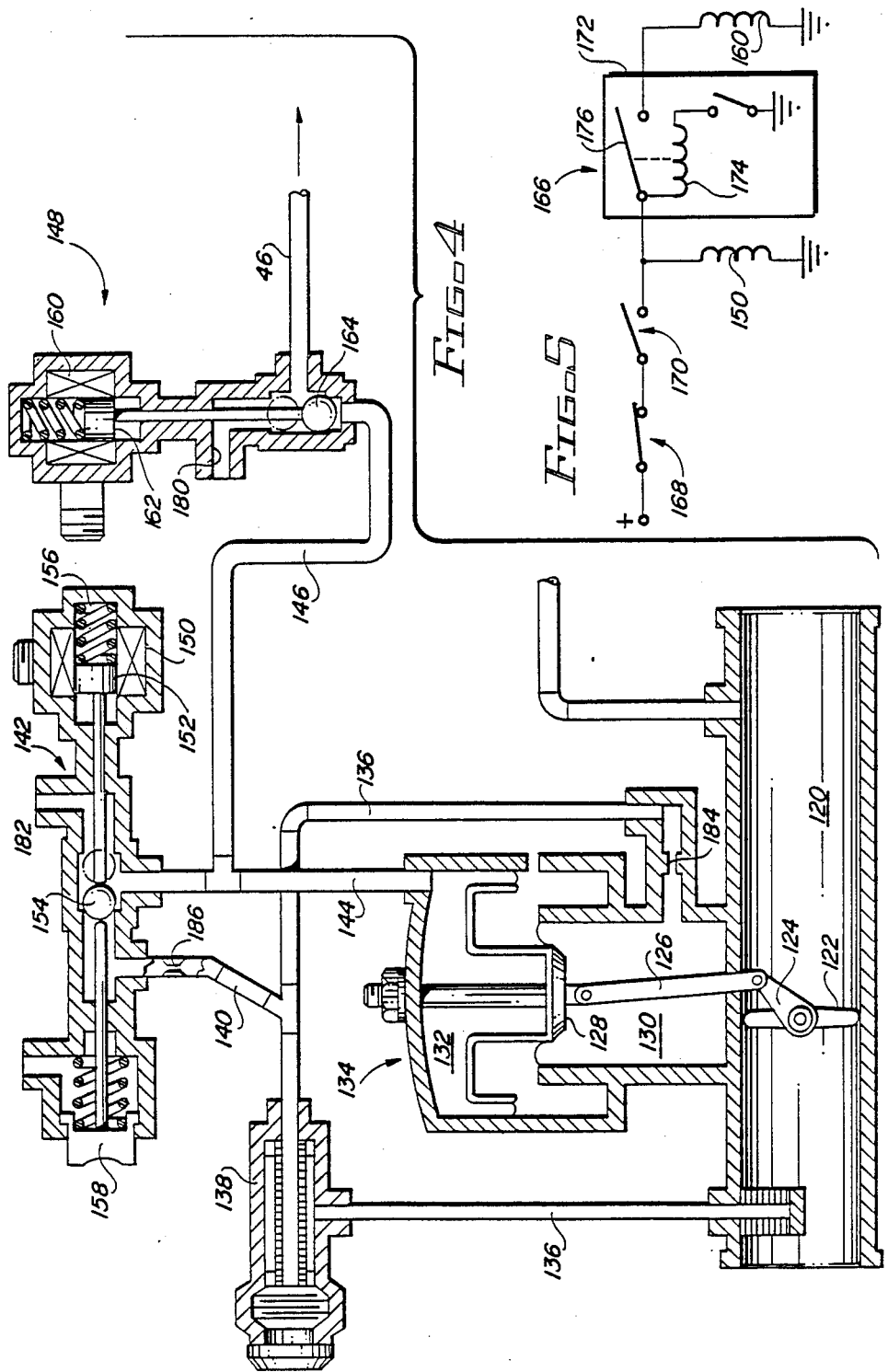

PAWL AND RATCHET CLUTCH AND AIR TURBINE STARTER HAVING SUCH A CLUTCH

This is a divisional application of Ser. No. 165,664 filed 03/08/88 and now allowed.

TECHNICAL FIELD

The field of the present invention is that of pawl and ratchet clutches. More particularly, the present invention is in this field of high speed pawl and ratchet clutches of the type used in air turbine starters.

Air turbine starters are known in the aviation field, and are commonly used to start propulsion turbine engines of modern aircraft. A persistent problem with high speed pawl and ratchet clutches of the type used in air turbine starters is wear to the clutch including its springs, pawls and ratchets caused by ratcheting of the clutch in operation. Such ratcheting occurs during spin down of a turbine engine after the turbine engine speed drops low enough that the pawls of a conventional clutch drop into engagement with the ratchet wheel. Subsequent to this pawl drop-in speed the turbine engine may continue to spin for a period of several minutes or more during which time the pawl and ratchet clutch is subjected to continuous ratcheting. Such continuous ratcheting wears the pawl springs as well as wearing the pawls and the teeth of the ratchet wheel.

Another period during which conventional pawl and ratchet clutches experience ratcheting occurs during a normal start. During a normal start with both the turbine engine and the air turbine starter stationary, the air turbine starter is provided with a flow of pressurized air which causes the turbine of the air turbine starter to drive the turbine engine toward starting speed through the pawl and ratchet clutch of the air turbine starter. Shortly after the turbine engine attains self-sustaining speed and begins to accelerate due to its own power production, the flow of pressurized air to the air turbine starter is discontinued so that the turbine thereof coasts to a stop. Consequently, the ratchet wheel of the air turbine starter also coasts to a stop while the pawl hub or carrier is accelerating with the combustion turbine engine. Between this time and the attainment of pawl throw-out speed, the pawls ratchet over the ratchet wheel of the air turbine starter resulting in considerable wear.

Yet another problem with conventional pawl and ratchet clutches of air turbine starters is the possibility of a crash engagement. Such a crash engagement may occur if a restart of a turbine engine is attempted while the engine is yet spinning after being shut off. That is, the engine may yet be spinning at a speed above the pawl throw-out speed of the pawl and ratchet clutch. Consequently, when the air turbine starter is provided with a flow of pressurized air it accelerates to its no-load speed in very short order. This no-load speed of the air turbine starter will be considerably above the pawl throw-out speed of the pawl and ratchet clutch. As the turbine engine is decelerating, it reaches a speed whereat the pawls return towards engagement with the ratchet wheel (i.e., the pawl drop-in speed). However, at this time the ratchet wheel is spinning much faster than the pawl carrier or hub. Consequently, as soon as the pawls engage the ratchet wheel, a violent collision occurs which may destroy the clutch and severely damage the air turbine starter.

In view of the above, it is recognized in the pertinent art that an improved pawl and ratchet clutch is needed. Such a pawl and ratchet clutch should avoid the shortcomings of the conventional clutches and air turbine starters described hereinabove.

DISCLOSURE OF THE INVENTION

In view of the above, the present invention provides a pawl and ratchet clutch mechanism between a driving element rotating in response to a flow of pressurized fluid and a rotatable driven element, and including a ratchet means secured for rotation with the driving element, pawl means mounted on the driven element for movement to engage the ratchet means to transmit rotary movement of the driving element to the driven element, and the pawl means being responsive to centrifugal force resulting from rotation of the driven element to tend towards disengagement from the ratchet means. The clutch of this invention also includes a movable stop means in a first position stopping the pawl means from engaging the ratchet means, and the stop means being movable to a second position allowing engagement of the ratchet means by the pawl means; and also including the driving element defining a bore, a piston member sealingly and movably received in the bore and cooperating with the driving element to define a variable volume chamber, a flow path communicating the variable volume chamber selectively with a source of pressurized fluid to move the piston member in a first direction, and means coupling the piston member with the stop means to move the latter to the second position thereof in response to movement of the piston member in the first direction.

Additionally, the present invention provides an air turbine starter having a clutch therein of the above described character and further including a pair of valve means so disposed that the first of the pair of valve means provides a flow of pressurized fluid to the turbine of the air turbine starter while the second of the pair of valve means provides flow of the pressurized fluid to the variable volume chamber of the improved pawl and ratchet clutch of the present invention. The pair of valve means are opened simultaneously in order to initiate a start cycle of the air turbine starter. After a determined period of time, the second of the pair of valve means is closed so that if the pawl and ratchet clutch is not engaged to transmit torque from the air turbine starter to the engine, the movable stop means will be returned to its position preventing engagement of the pawls with the ratchet wheel. In this latter position, the movable stop means also provides a circumferentially continuous raceway surface upon which the pawls are engagable in the event that the turbine engine is coasting down and drops below the pawl fall back speed while the air turbine starter is spinning under power. In this way a crash engagement is positively prevented.

Additional objects and advantages of the present invention will be apparent from the reading of the following detailed description of a single preferred embodiment of the invention taken in conjunction with the appended drawing figures of which;

BRIEF DESCRIPTION OF THE DRAWINGS

FIG. 4 depicts schematically and partially in cross section a pressurized fluid control portion of the air turbine starter according to the present invention; and FIG. 5 schematically depicts a time delay electrical circuit which is used in conjunction with the pressurized fluid control apparatus of FIG. 4.

BEST MODE FOR CARRYING OUT THE INVENTION

Figure 1:
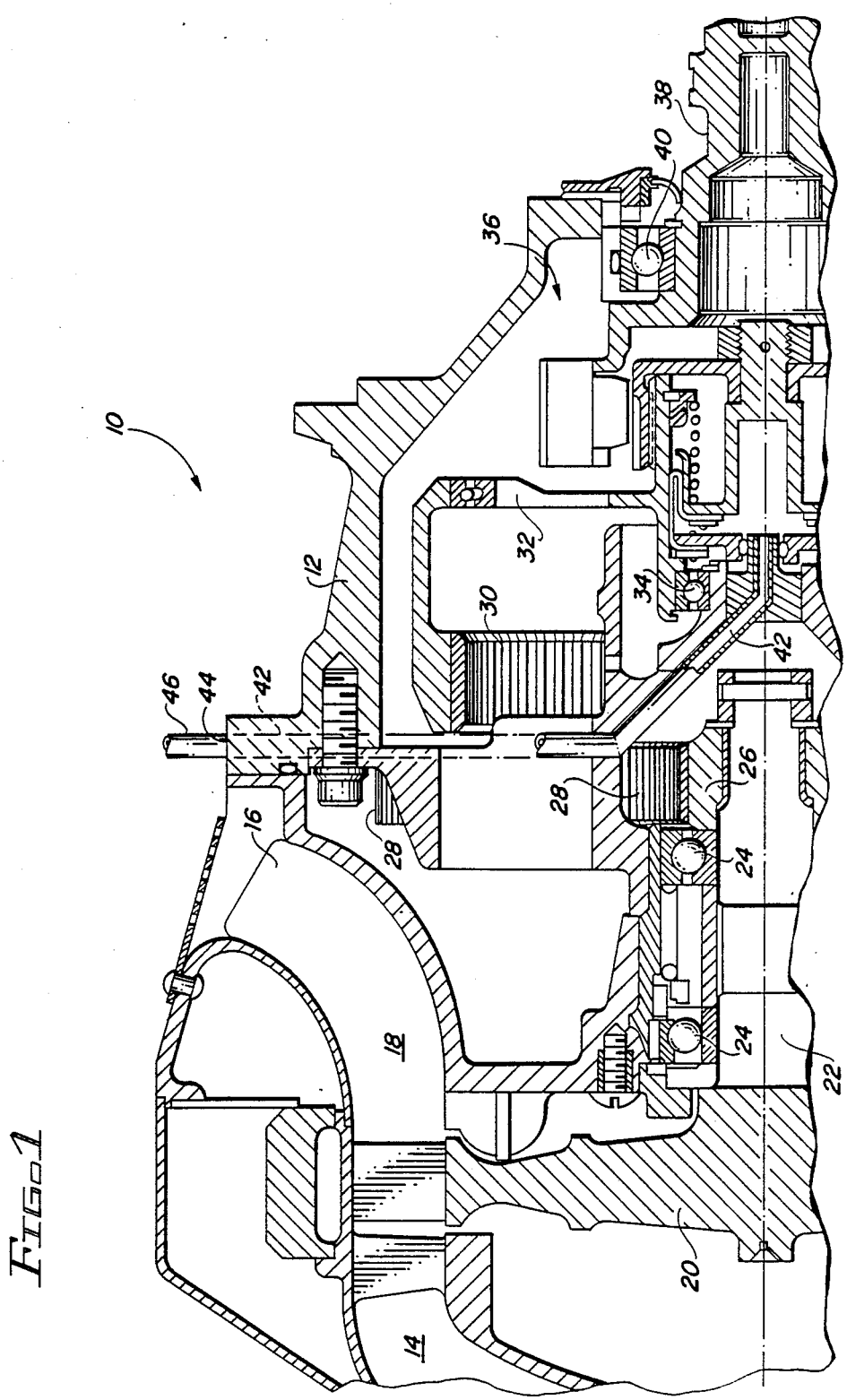
FIG. 1 presents a fragmentary partially cross sectional view of an air turbine starter embodying the present invention.

FIG. 1 depicts an air turbine starter (10) embodying the present invention. The air turbine starter (10) includes a housing (12) defining an inlet (14) (only a portion of which is depicted viewing FIG. 1) and an outlet (16). The housing (12) defines a flow path (18) extending between the inlet (14) and the outlet (16). An axial flow turbine member (20) is rotatably journaled by the housing (12) in the flow path (18) for extracting mechanical energy from a flow of pressurized fluid conducted between the inlet (14) and the outlet (16) via the flow path (18). The turbine member (20) is carried by a rotatable shaft (22) journaled by bearings (24) carried by the housing (12). Secured to the shaft member (22) is a gear member (26) engaging a speed-reducing gear train generally referenced with the numeral (28). The gear train (28) includes a gear portion (30) of an output member (32) which is also journaled by the housing (12) by a bearing member (34) carried thereby. The output member (34) drivingly connects with a pawl and ratchet clutch (36) which in turn drivingly connects with an output shaft (38). The output shaft (38) is rotatably carried by the housing (12) via bearing member (40). It will be noted that the housing (12) defines an actuating fluid flow path (42) extending from an inlet port (44) to the pawl and ratchet clutch (36), as will be more fully explained hereinbelow. A conduit (46) connects with the inlet port (44) in order to provide a flow of pressurized actuating fluid thereto and to the pawl and ratchet clutch (36) via the flow path (42).

Figure 2:
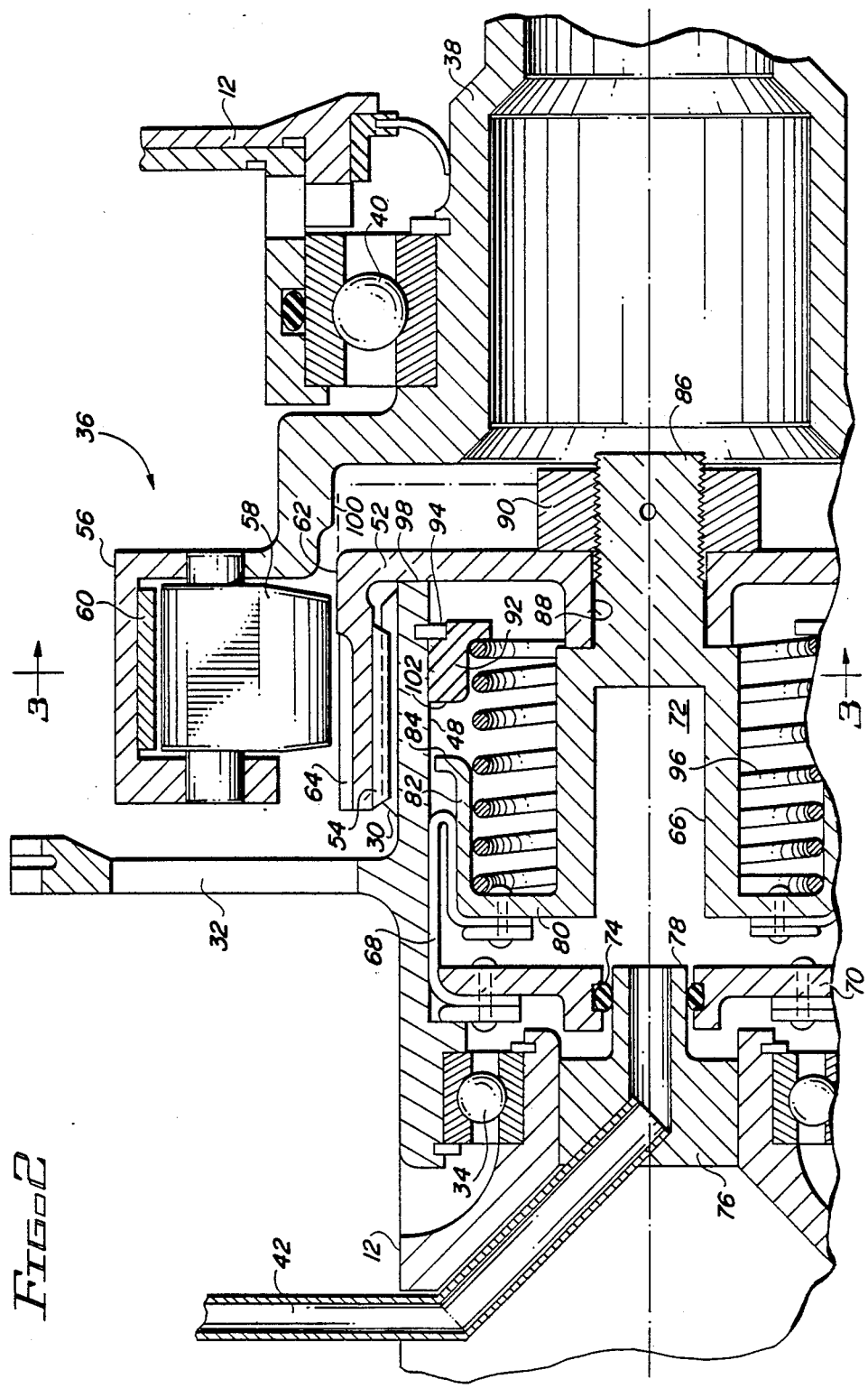
FIG. 2 depicts an enlarged fragmentary cross sectional view of a selected portion of the air turbine starter depicted more fully in FIG. 1.

Turning now to FIG. 2, it will be seen that the output member (32) defines both an axially extending bore (48) therein as well as an axially extending outwardly disposed male spline portion (50) thereon. A ratchet member generally referred to with the number (52) is axially slidably carried upon the male spline portion (50) via a female spline portion (54) thereof. Consequently, the ratchet member (52) is drivingly engaged with the output member (32) for rotation in unison therewith.

The clutch (36) also includes a clutch hub portion (56) which is carried by and drivingly engaged with the output shaft (38). The clutch hub portion (56) pivotally carries a plurality of circumferentially extending and radially movable pawl members (58) which are centrifugally responsive, (only one of which is visible viewing FIG. 2). Each one of the plurality of pawl members (58) is yieldably biased radially inwardly toward engagement with the ratchet member (52) by a respective one of a plurality of leaf type pawl springs (60) (again, only one spring (60) being visible on FIG. 2).

The plurality of pawl members (58) are movable radially inwardly under the influence of springs (60) to engage either one of a circumferentially extending cylindrical surface (62) of the ratchet member (52), or a circumferentially extending plurality of ratchet teeth (64) also defined by the ratchet member (52). It will be understood that in the relative operative positions of the ratchet member (52) and pawls (58) depicted in FIG. 2, that the pawls are not engagable with the ratchet teeth (64) and are slidably disposed upon the cylindrical surface (62). As a consequence, the output member (32) is not drivingly connected with output shaft (38) in the relative operative positions of the ratchet member (52) and pawls (58) as is depicted in FIG. 2.

Figure 3:
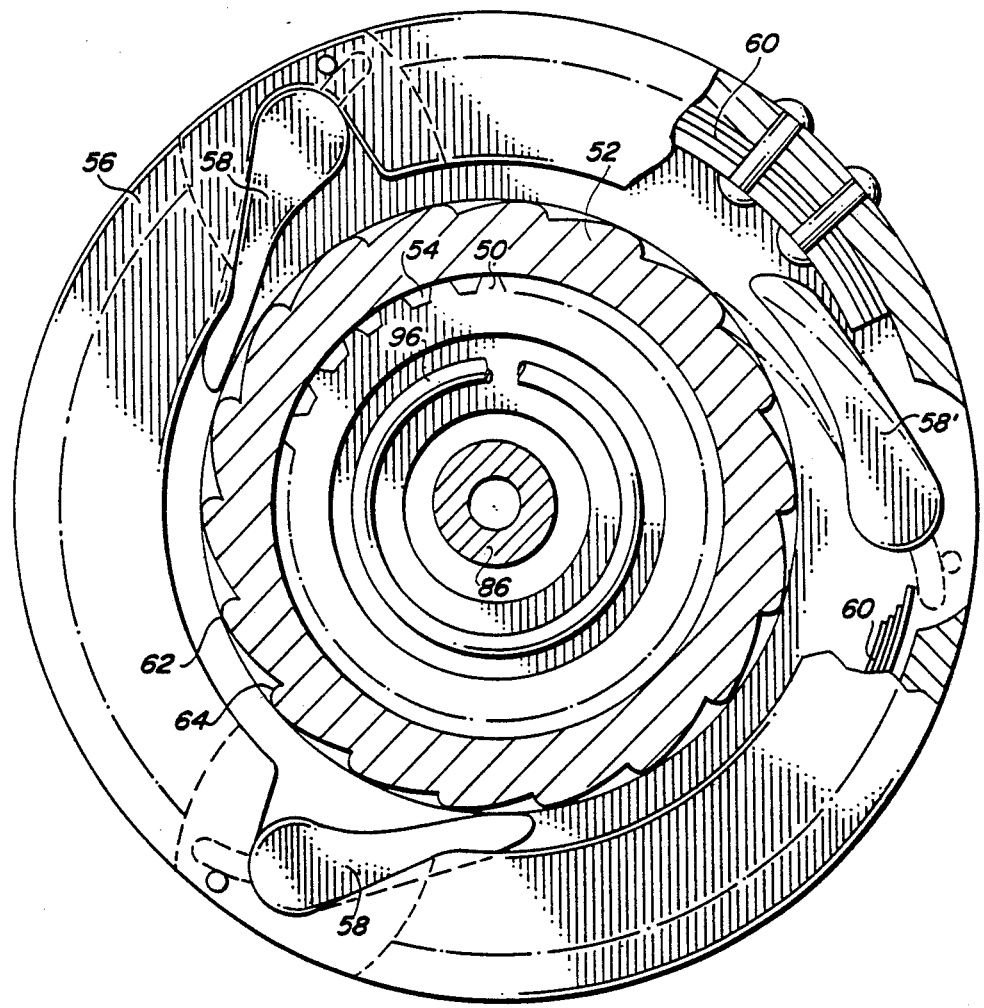
FIG. 3 presents a transverse, partially cross sectional view of the pawl and ratchet clutch of the present invention taken along line 3—3 of FIG. 2.

Considering FIGS. 2 and 3 in further detail, it will be seen that a piston member (66) is movably disposed within the bore (48). The piston member (66) is movably and sealingly associated with the output member (32) via a flexible rolling-diaphragm type of sealing member (68). The sealing member (68) is in turn carried by an annular partition member (70) received within the bore (48). Consequently, it will be seen that the piston member (66), sealing member (68), and partition member (70) cooperate with the output member (32) to define a variable-volume chamber (72) therewithin.

In order to conduct pressurized actuating fluid to the variable-volume chamber (72), the annular partition member (70) carries a centrally disposed sealing member (74). An inlet fitting (76) is carried by the housing member (12) and defines an axially extending tubular portion (78) extending into the sealing member (74) of the partition member (70). The actuating fluid flow path (42) communicates with the inlet fitting (77) and conducts pressurized actuating fluid from conduit 46 into the variable-volume chamber (72).

The piston member (66) includes a radially extending flange portion (80) and an axially extending portion (82) extending therefrom to terminate in an end surface (84). The piston member (64) also includes an axially extending stem portion (86) extending to and through a central opening (88) of the ratchet member (52) and secured therein by a nut member (90) threadably engaged upon the stem (86). In order to bias the piston member (66) into a first operative position as is depicted in FIG. 2, an annular spring seat member (92) is received within the bore (48) and captured therein by a split ring retainer (94). A coil compression spring (96) extends from the spring seat member (92) to the flange (80) of the piston member (66). Consequently, the ratchet member (52) is yieldably biased into engagement with an end edge (98) of the output member (32) as is depicted in FIG. 2.

Again viewing FIGS. 2 and 3 in conjunction, it will be easily understood that the piston member (66) is movable rightwardly in bore (48) in response to the receipt of pressurized fluid therein via actuating flow path (42). Rightward movement of the piston member (66) also moves the ratchet member (52) rightwardly in order to engage the cylindrical surface (62) thereof in an axially aligned recess or bore portion (100) of the output member shaft (38), as is depicted in dashed lines viewing FIG. 2. This rightward movement of the piston member (66) and ratchet member (52) is limited by engagement of the end surface (84) of the piston member (66) with a shoulder surface (102) defined by the spring seat member (92) within the bore (48). A consequence of the rightward movement of the piston member (66) and ratchet member (52) is sliding engagement of the female spline surface (54) upon the male spline surface (50) and movement of the ratchet teeth (64) of the ratchet member (52) into radial alignment with the plurality of pawl members (58) carried by the clutch hub portion (56).

Rightward movement of the ratchet member (52) which results in the cylindrical surface (62) moving out of radial registry with the plurality of pawl members (58), so that the latter are movable radially inwardly to drivingly engage with the ratchet teeth (64) signifies movement of the ratchet member (52) to a second operative position thereof. It will be understood that in the second operative position of the ratchet member (52) the output member (32) is drivingly connected with the output shaft (38) via the male and female spline surfaces (50) and (54), the ratchet teeth (64) and the plurality of pawl members (58) carried by the hub portion (56).

Turning now to FIGS. 4 and 5, it will be seen that a flow path (120) leading to the inlet of the air turbine starter (10) is provided with a valve member (122) so that flow of pressurized fluid therein may be selectively opened or closed. The position of the valve member (122) is controlled by a lever (124) to which a link (126) is connected. The link (126) at its end opposite the lever (124) connects with an actuator member (128) carried between a pair of chambers (130) and (132). The immediately foregoing elements will be understood to define a pneumatic actuator (134).

A control fluid conduit (136) leads from the flow path (120) upstream of the valve member (122) to a filter member (138), and thence to the chamber (130), having the smaller area of effective exposure on actuator member (128). A branch conduit (140) communicates both with the control fluid conduit (136) downstream of the filter (138) and with a solenoid control valve generally referenced with the numeral (142). The solenoid control valve (142) is arranged to selectively supply pressurized fluid supplied thereto via the branch conduit (140) to a conduit (144) communicating with the chamber (132) having the larger effective area exposed to actuator member (128). A branch conduit (146) extends from the conduit (144) to a secondary solenoid valve (148), which is normally spring loaded closed. Conduit (46) extends from the solenoid valve (148) to the air turbine starter (10).

Turning once again to the solenoid control valve (142), it will be seen that this solenoid valve includes a solenoid coil (150) acting upon an armature member (152) to draw the latter rightwardly and to thereby move a valve member (154) into an open position in opposition to a spring member (156). Such movement of the valve member (154) to an open position as depicted in dashed lines allows flow of pressurized fluid from the conduit (140) into the conduit (144). Alternatively, a manual push button (158) may be employed to also move the valve member (154) to the open position as depicted.

Similarly, the solenoid valve (148) includes a solenoid coil (160) acting upon an armature member (162) to draw the latter upwardly and allow movement of a valve member (164) to an open position as depicted in dashed lines viewing FIG. 4. Movement of the valve member (164) to the open position as depicted in dashed lines allows communication of pressurized fluid from conduit (146) to conduit (46) and thence to the air turbine starter (10), recalling the description of FIGS. 1 through 3.

In order to complete this description of the invention, attention must be given briefly to FIG. 5 wherein an electrical control circuit for the solenoid valves (142) and (148) is depicted. The control circuit (166) includes an enabling switch (168) of the single pole single throw type, and a starting switch (170) of the push button momentary contact type. It will be seen that closure of switches (168) and (170) allows conduction of electrical power through the solenoid coil (150) of the solenoid control valve (142). Also included in the control circuit (166) is a normally open time delay or count down timer relay (172). The time delay relay (172) may provide electrical power to the solenoid coil (160) of the solenoid valve (148). The normally open time delay relay (172) is of the type having an actuating coil (174) connected between an input terminal thereof and a ground connection, and a switching element (176) which is drawn into a closed position for a specified period of time following application of electrical power to the input connection of the relay. Following the specified time period, the coil (174) is de-energized and element (176) moves to the open position as depicted.

Having observed the structure of the air turbine starter (10) and associated pneumatic and electrical control system, attention may now be given to its method of operation. During a normal start cycle of a combustion turbine engine with both the air turbine starter (10) and the engine being stationary, a supply of pressurized fluid is connected with the flow path (120), the enabling switch (168) is closed, and the push button start switch (170) is closed for a specified starting time period. Consequently, electrical power is provided both to the solenoid coil (150) of solenoid control valve (142) and to the actuating coil (174) of the normally open time delay relay (172). The actuating coil (174) of the relay (172) draws the switching element (176) closed and provides power thereby to the solenoid coil (160) of solenoid valve (148).

It will be appreciated that prior to opening of the solenoid valve (142) the pressurized fluid in flow path (120) has been conducted via the conduit (136) and filter (138) to the chamber (130) of the pneumatic actuator (134). Consequently, the actuator member (128) is urged upwardly and via the link (126) and lever (124) assures that the valve member (122) is maintained in a closed position. However, upon the energizing of the solenoid coil (150) of solenoid valve (142), as described herein immediately above, the valve member (154) is shifted to an open position and provides pressurized fluid via the conduit (144) to the chamber (130) of the pneumatic actuator (134). Because the chamber (130) has the greater effective area on actuator member (128), the latter is shifted downwardly, and via the link (126) and lever (124) opens the valve member (122). Consequently, a flow of pressurized fluid is communicated via flow path (120) to the inlet of the air turbine starter (10), as is depicted by the fluid flow arrows (178). Viewing FIG. 1, it will be seen that a flow of pressurized fluid through the housing (12) via the flow path (18) will cause the turbine (20) to extract mechanical power therefrom and to deliver this power to the output member (32) via the gear train (28).

Substantially simultaneously with the opening of the valve member (154) and valve member (122), the valve member (164) of solenoid valve (148) is opened by solenoid coil (160). Thus, a flow of pressurized control fluid is provided to the chamber (70) of the air turbine starter (10) via the conduit (46), actuating fluid flow path (42), and inlet fitting (74), viewing FIGS. 2 and 4. The pressurized fluid received within chamber (70) of the air turbine starter (10) causes the piston member (64) to be shifted rightwardly and to move the ratchet member (52) rightwardly from its first position as depicted in FIG. 2 to its second operative position as previously described wherein the pawl members (58) are drivingly engaged with the ratchet teeth (62) thereof.

As a consequence of the above-described actions, the turbine member (20) receives a flow of pressurized fluid (depicted by arrows (178), viewing FIG. 4) and begins to extract mechanical power therefrom substantially contemporaneously with the rightward shift of the piston member (64) of the pawl and ratchet clutch (36) and the movement of the ratchet member (52) to its second operative position. Consequently, the output member (32) of the air turbine starter is drivingly connected with the output shaft (38) substantially simultaneously with the beginning of power production at the turbine wheel (20). The air turbine starter (10) delivers mechanical power in this way to the output shaft (38) thereof and to the combustion turbine engine connected thereto to accelerate the latter towards its self-sustaining speed.

During acceleration of the combustion turbine engine towards its self-sustaining speed the normally open time delay relay (172) times out so that electrical power is no longer supplied to the solenoid coil (160) of solenoid valve (148). Thus, solenoid valve (148) moves to its normally closed position allowing venting of the conduit (46) to atmospheric pressure via a vent port (180) thereof. Venting of the conduit (46) results in a decrease of fluid pressure within the chamber (70) of the air turbine starter (10) so that the spring (90) attempts to move the piston member and ratchet member (52) to their first operative position, viewing FIG. 2. However, so long as the turbine wheel (20) is delivering mechanical power and torque is being transmitted between the ratchet teeth (62) and the pawls (58), the ratchet member (52) cannot return to its first operative position because of engagement of the pawls (58) therewith. In other words, the pawls (58) are held in engagement with the ratchet member (52) by the torque transmission therebetween, and function as mechanical stops preventing the ratchet wheel from moving to its first operative position. The same also applies with respect to radially outward movement of the centrifugally responsive pawl members (58) during acceleration of the pawl hub and combustion turbine engine toward self-sustaining speed. During this acceleration, the pawl throw-out speed is reached and exceeded. However, the pawls (58) will not disengage from ratchet member (52) so long as sufficient torque is being transmitted. Therefore, the air turbine starter continues to provide torque to the combustion turbine engine and to drive the latter toward its self-sustaining speed.

Upon the combustion turbine engine obtaining its self-sustaining speed, the shaft thereof will accelerate ahead of the output shaft (38) of the air turbine starter (10). Consequently, the torque loading between the ratchet member (52) and the pawls (58) of the clutch (36) will be eliminated. The pawls (58) disengage from the ratchet member (52) and move to the radially outward position referenced by pawl member (58'), viewing FIG. 3. In this position the pawls (58) are completely free of the ratchet member (52). Consequently, the ratchet member (52) is moved to its first operative position depicted in FIGS. 1 and 2.

Shortly after the turbine engine reaches self-sustaining speed, the solenoid valve (142) is closed via switch (170). Consequently, the chamber (132) is vented to ambient via a port (182), and the valve member (122) moves to its closed position. As a result, the air turbine starter (10) coasts to a stop and remains stopped during operation of the turbine engine.

When the combustion turbine engine is shut down it coasts to a stop over a period of time. During this deceleration of the engine, the pawl drop in speed will be reached whereat the spring force of springs (60) overcomes the centrifugal force of pawls (58). Thus, the pawls (58) move to their position depicted in FIGS. 1, 2, and on the left side of FIG. 3. During further coast down of the turbine engine the pawls (58) ride upon the surface (60) so that ratcheting and wear of the pawls (58) and ratchet teeth (64) are prevented.

In the event that a restart of the turbine engine is initiated while the engine is yet coasting to a stop, two possible conditions may exist. If the engine has decelerated to a speed below the pawl drop in speed, the pawls will be running on the surface (60). When the start sequence is initiated, the ratchet member (52) moves to its second operative position with the ratchet teeth (64) in alignment with the pawls (58). Thus, the pawls (58) will ratchet over the ratchet teeth (64). However, this ratcheting will be very short in duration because the air turbine starter accelerates without load to quickly match the speed of the turbine engine. When this speed match is achieved, the air turbine starter (10) drives the engine toward its self-sustaining speed as in a normal start from rest.

On the other hand, if a restart of the engine is attempted while the latter is yet above the pawl drop in speed, the ratchet member (52) moves to its second position in alignment with the pawl members, as previously described, and the air turbine starter (10) accelerates without load. However, the no-load acceleration of the air turbine starter, and its speed versus time from start initiation, are scheduled so that the speed of ratchet member (52) cannot reach the pawl drop in speed within the time period of time delay relay (172). Consequently, a crash engagement of the clutch (36) cannot occur.

Scheduling of the no-load acceleration of the air turbine starter (10) is provided by matching the sizes of a pair of restrictive orifices (184,186), respectively disposed in conduits (136,140), and the volumes of the chambers (130,132). When the actuator (134) moves the valve member (122) from its closed position toward a fully open position, fluid is displaced from chamber (130) and flows into chamber (132). Additional fluid must also be provided via the flow path (120) to fill the greater volume of chamber (132). All of this fluid flow must pass through the orifices (184,186). By matching the size of these orifices with the volumes of chambers (130,132), the rate of initial opening of valve member (122) from its closed position toward its fully open position is controlled. In other words, the valve member (122) is allowed to open slowly. This slowed opening of the valve member (122) controls the no-load acceleration of the air turbine starter (10), as expressed at ratchet member (52). The rate of acceleration at ratchet member (52) and the time period of time delay relay (172) are chosen with a view to the pawl drop in speed so that a crash engagement of clutch (36) cannot occur.

While the present invention has been depicted and described by reference to one particular preferred embodiment thereof, no limitation upon the invention is implied by such reference, and no such limitation is to be inferred therefrom. The invention is intended to be limited only by the spirit and scope of the appended claims which provide additional definition of the invention.

What is claimed is:

1. A pawl and ratchet clutch mechanism between a driving element rotating in response to a flow of pressurized fluid and a rotatable driven element, comprising:

ratchet means secured for rotation with the driving element;

pawl means mounted on the driven element for movement to engage said ratchet means to transmit rotary movement of the driving element to the driven element, said pawl means being responsive to centrifugal force resulting from rotation of the driven element to tend toward disengagement from said ratchet means;

movable stop means for in a first position stopping said pawl means from engaging said ratchet means, said stop means moving to a second position allowing engagement of said ratchet means by said pawl means; and said driving element defining a bore, a piston member sealingly and movingly received in said bore and cooperating with said driving element to define a variable-volume chamber, flow path means communicating said pressurized fluid to said variable-volume chamber to move said piston member in a first direction, and means coupling said piston member with said stop means to move the latter to said second position in response to movement of said piston member in said first direction.

2. The invention of claim 1 further including time delay valve means defining a part of said flow path means for communicating said pressurized fluid with said variable volume chamber only during a predetermined time interval following initiation of said flow of pressurized fluid, and for interrupting said pressurized fluid communication upon lapse of said time interval.

3. The invention of claim 2 wherein said time delay valve means also includes means for venting said variable-volume chamber to ambient following said interrupting of pressurized fluid communication thereto, and resilient means yieldably biasing said movable stop means to said first position thereof.

4. The invention of claim 1 wherein said movable stop means includes said ratchet means including a ratchet member defining a circumferentially arrayed plurality of axially extending and radially outwardly disposed ratchet teeth and a circumferentially continuous land surface axially adjacent with said ratchet teeth, said ratchet member coupling with said driving member for relative axial movement, and in said first position of said movable stop means said pawl means radially aligning with said land surface to prevent engagement of said pawl means with said ratchet teeth.

5. The invention of claim 4 wherein said land surface defines a radial dimension exceeding that of said ratchet teeth, said land surface carrying said pawl means circumferentially out of engagement with said ratchet teeth, and said pawl means partially radially overlying said ratchet teeth in said first position of said stop means.

6. The invention of claim 5 wherein said driving element further defines an axially extending portion, said axially extending portion outwardly bounding said variable-volume chamber and defining means for drivingly coupling with said ratchet member while allowing relative axial movement thereof, said axially extending portion carrying said ratchet member.

7. The invention of claim 6 wherein said driven member defines an axially extending recess coaxial with said driving member and ratchet member, said ratchet member land surface being disposed axially toward said recess, and said land surface being received in said recess in said second position of said movable stop means.

* * * * *